United States Patent [19]

Malrick

[11] Patent Number: 4,652,185
[45] Date of Patent: Mar. 24, 1987

[54] HOLE SAWS

[76] Inventor: David A. Malrick, 8289 Spring Lake Park Rd., Minneapolis, Minn. 55432

[21] Appl. No.: 725,895

[22] Filed: Apr. 22, 1985

[51] Int. Cl.⁴ ............................................. B23B 51/05
[52] U.S. Cl. ....................................... 408/68; 125/20;
408/205; 408/209; 408/703
[58] Field of Search ................. 408/68, 117, 118, 119,
408/67, 204, 205, 207, 208, 209, 703, 202, 203,
203.5; 125/20

[56] References Cited

U.S. PATENT DOCUMENTS

| 1,058,149 | 3/1913 | Campbell | 408/202 |
| 2,591,516 | 3/1952 | Darnell | 408/68 |
| 3,265,104 | 8/1966 | Gallo, Sr. | 408/68 |
| 3,390,596 | 7/1968 | Trevathan | 408/206 |
| 4,303,357 | 12/1981 | Makar | 408/204 |
| 4,322,187 | 3/1982 | Hougen | 408/204 |

Primary Examiner—Z. R. Bilinsky
Assistant Examiner—Arthur Dougas
Attorney, Agent, or Firm—Vidas & Arrett

[57] ABSTRACT

A device for removing waste plugs from hole saws comprising a plug member positioned internally of a hole saw and retained therein by means of screws or other projections which extend outwardly through cleanout slots of the hole saw. The projections may be joined through an external annular ring which encircles the hole saw. The ring may be grasped and forced downwardly causing the plug member to eject a waste plug from the hole saw. A spring may be positioned between a mandrel of the hole saw and the plug member in order to normally bias a plug member downwardly to assist its positioning and ejectment of a waste plug.

11 Claims, 4 Drawing Figures 4,652,185

HOLE SAWS

I. DESCRIPTION

Field of the Invention

This invention relates to annular hole saws. In particular, the invention relates to saws and assemblies which may be added to conventional hole saws for assisting the removal a waste plug within the hole saw after cutting is completed.

Background of the Invention

Conventional hole saws typically include a cylindrical body having a circular series of saw teeth at one end and a mandrel including a shank attached to the opposite end wall of the cylindrical body. The shank is received into the chuck of an electric drill. The mandrel further includes a pilot drill which extends through the interior of the cylindrical body and past the saw teeth. The pilot drill thereby contacts the surface to be cut before the saw teeth to aid in the positioning of the hole saw.

Typically, hole saws include two or more clean-out slots which extend from slightly above the saw teeth toward the mandrel. The cleanout slots are useful in allowing sawdust to escape during the sawing process. This theoretically makes removal of the waste plug from within the interior of the hole saw easier.

In practice, it has been found that waste plugs are often difficult to remove from the interior of the hole saw. The slots do not allow sufficient sawdust to escape and the plug remains tightly bound within the interior of the hole saw. The waste plug is then usually removed by physically tapping the hole saw against an object or by trying to insert a thin object such as a screwdriver tip through one of the cleaning slots to push the waste plug out of the hole saw. Both of these methods are very unsatisfactory. Hole saws are fabricated from a relatively thin sheet stock which is not designed to take heavy forces along its side walls. Also, screwdriver tips tend to tear and bend the hole saw walls. Additionally, if only one screwdriver is inserted into a hole, the waste plug tends to have a camming action which may wedge it even more tightly within the hole saw.

BRIEF SUMMARY OF THE INVENTION

The present invention consists of devices which may be added to conventional hole saws to aid in removal of waste plugs and in hole saws having a plug-removing device built into the assembly.

Conventional hole saws having a cylindrical body having a circular series of saw teeth at one end and a mandrel attached to the other end may be modified by the addition of a waste-plug removing device of the invention. This form of the invention includes a plug member which may freely pass into the interior of the cylindrical body of the hole saw. The plug member includes an opening through which the pilot drill may extend. After the plug member is inserted into the hole saw, screws are passed through conventional cleanout slots of the hole saw from the exterior into the interior where they are attached to the plug member.

Since conventional hole saws include at least two spaced clean-out slots, the plug member of the invention is supported and retained within the interior of the cylindrical body of the hole saw by at least two screws. An operator of the hole saw may remove a waste plug from the interior of the hole saw by merely pushing downwardly on the screw heads which extend externally of the hole saw. Pressure may simultaneously be exerted from several directions in order to prevent the waste plug from twisting and camming within the interior of the hole saw.

In the preferred form, a compression spring is positioned within the hole saw interior between the mandrel and the plug member such that the plug member is normally biased downwardly toward the cutting teeth. In the most preferred form, the lower surface of the plug member will extend slightly beyond the plane formed by the ends of the cutting teeth such that a waste plug would be completely pushed out of the hole saw by the plug member.

In order to make the waste plug removing device even easier to utilize, screws are preferably first passed through an outer collar member which loosely encircles the hole saw. In this manner, an operator may position a forefinger and thumb along the collar and push downwardly which will cause the waste plug to be removed. When three or more equally spaced screws are utilized, a spring is not required since the plug member will be retained in the same plane or relationship without the assistance of the spring.

BRIEF DESCRIPTION OF THE DRAWINGS

Preferably, the hole saws are manufactured to include a waste plug removing device of the invention. Before the mandrel is secured to the cylindrical body of the hole saw, a waste plug removing device consisting of a pair of concentric rings joined together by extension is slipped into the cleanout slots. When the mandrel is secured, the plug removing device may freely move up and down the cleanout slots and the external ring provides a handle to control the movement of the internal, waste removing ring.

A detailed description of the invention is hereinafter described with specific reference being made to the drawings in which:

FIG. 3 is a cross-sectional view taken along the plane defined by lines 3—3 of FIG. 1, and FIG. 4 is an exploded, perspective view of an improved hole saw of the invention.

DETAILED DESCRIPTION OF THE INVENTION

Figure 1:
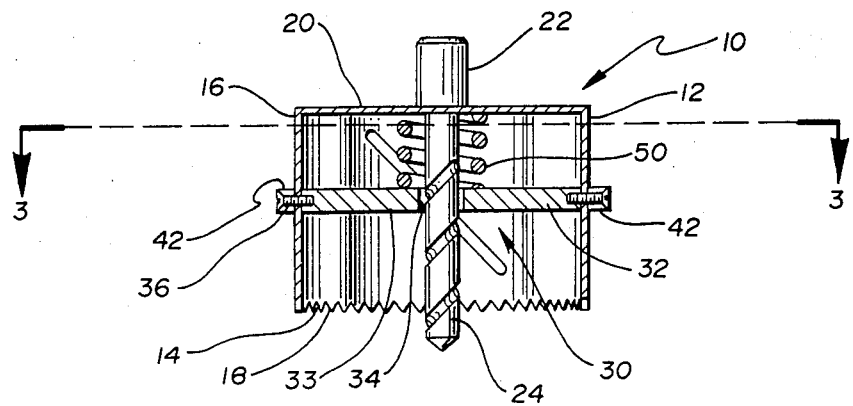
FIG. 1 is a cross-sectional view of the plug-removing device of the invention positioned within a hole saw.
Figure 2:
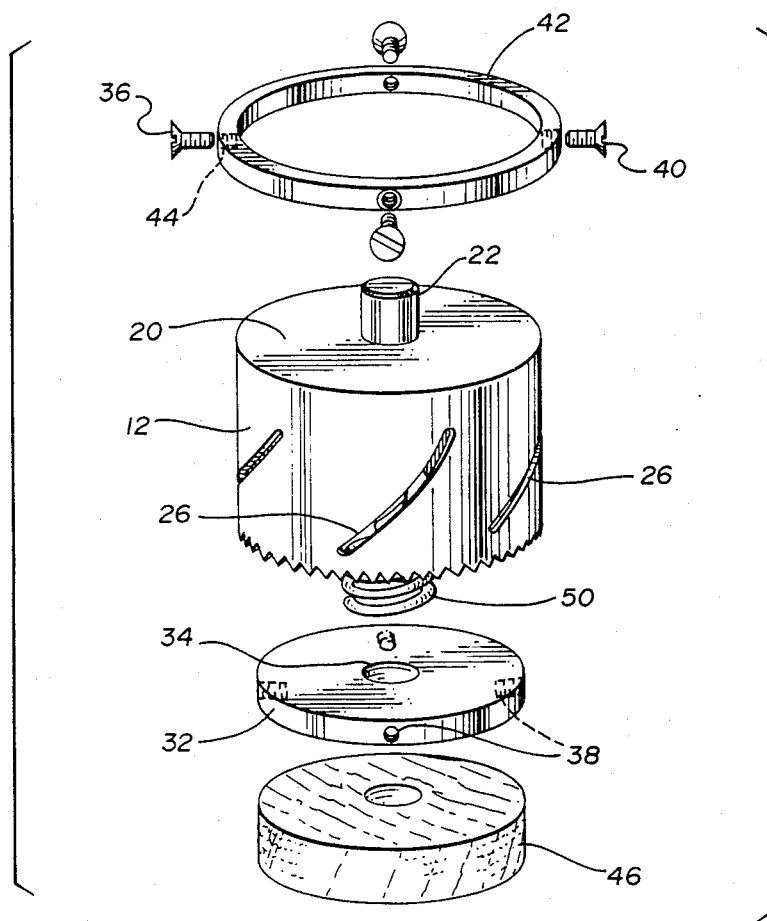
FIG. 2 is an exploded perspective view of the device of FIG. 1.

With reference to FIGS. 1 and 2 a conventional hole saw 10 is shown which has been modified by adding a waste plug removing device 30 of the invention.

Conventional hole saw 10 includes a cylindrical member 12 having a lower end 14 and an opposed upper end 16. Lower end 14 includes a plurality of saw teeth 18 as shown.

A mandrel 20 is fixedly secured to upper end 16 of hole saw 10 by welding or other means. Mandrel 20 includes a shank 22 for reception in the chuck of an electric drill. Mandrel 20 further includes a pilot drill 24 which extends downwardly through the interior of cylinder member 12 as shown. The pilot drill 24 extends beyond the plane defined by saw teeth 18 as shown in FIG. 1.

Conventional hole saws typically include two or more cleanout slots which perforate the walls of cylindrical member 12. In the embodiment shown in FIGS.

1-3, the hole saw 10 is shown to include four helically wrapped, spaced cleanout slots 26. The cleanout slots extend from slightly above saw teeth 18 toward upper end 16.

Waste plug removing device 30 includes a plug member 32 which is dimensioned such that it fits easily within the interior of cylindrical member 12. Plug member 32 includes an opening 34 through which the pilot drill 24 freely extends. Plug member 32 is retained within the interior of hole saw 10 by screws 36 which are inserted through cleanout slots 26 from the exterior into the interior where they are fastened to threaded bores 38 of plug member 32. In the simplest form, screws 36 are shoulder-collared screws having enlarged heads 40. The heads are too large to pass through the width of cleanout slots 26.

In the preferred form shown in FIGS. 1 through 3, an annular collar 42 is positioned over the exterior of cylinder member 12 and screws 36 are passed through openings 44 in collar 42 throuqh cleanout slots 26 and into threaded bores 38 of plug member 32. In this manner, an operator merely has to grasp the annular collar 42 between a thumb and forefinger in order to push plug member 32 downwardly to remove a waste plug 46. Without the collar, an operator merely pushes down on two or more of the screw heads 40 in order to force the waste plug out of the hole saw.

As shown in FIGS. 1 through 3, waste plug removing device 30 may include a compression spring 50 which is positioned between the upper surface of plug member 32 and the lower surface of mandrel 20. Compression spring 50 normally biases plug member 32 downwardly until screws 36 reach the lowest position of cleanout slots 26. For hole saws which include only two cleanout slots 26, the compression spring 50 is used both to bias the plug member 32 downwardly and to prevent plug member 32 from applying unequal pressure to waste plug 46 which would otherwise cam a waste plug 46 in the hole saw.

In the preferred form, plug member 32 resembles a washer in appearance and has a thickness such that its lower surface 33 will extend past the plane defined by saw teeth 18 when plug member 32 is in its lowest position. Although the figures show plug member 32 as a circular washer, plug member 32 may be of any configuration having an opening 34 for pilot drill 24 to pass through and having dimensions which allow it to freely pass within the interior of cylindrical member 12.

Since the length of the distance between teeth 18 and mandrel 20 determines the depth of wood which may be cut by hole saw 10, it is preferred to keep plug member 32 relatively thin. However, the thickness of plug member 32 should be sufficient such that it extends beyond saw teeth 18 in its lower-most position in order to fully remove waste plug 46 from the hole saw 10.

Alternatively, a hole saw 100 may be constructed with an integral waste plug removing device 110 as shown in FIG. 4. Waste plug device 110 may be formed from a single, stamped piece of metal or similar material. As shown in FIG. 4, waste plug device 110 may include an internal plug member portion 112 having an opening 114 therethrough. Plug member portion 112 is joined to an annular collar 116 by two or more extensions 118. The number of extensions is determined by the number of clean-out slots 120 formed in hole saw 100.

Hole saw 100 is constructed by forming cylindrical member 122 from a band of metal having teeth 124 at one end and slots 120 cut through upper edge 126. The metal is then formed into a cylinder. Waste plug device 110 is then positioned over upper edge 126 of cylindrical member 122 such that extensions 118 pass into cleanout slots 120. Waste plug device 110 may freely float up and down within the hole saw. A mandrel 130 including a shank 132 and pilot drill 134 is permanently attached by welding or other suitable means to upper edge 126 of cylindrical member 122.

Hole saw 100 as shown in FIG. 4 couples the action of cleanout slots with the novel waste plug removing device of the invention. A waste plug may be easily removed from the interior of hole saw 100 by grasping annular collar 116 at two or more points along the ring. Downward pressure forces the waste plug out of the hole saw.

Hole saw 100 may include all of the features outlined above including a compression spring. Waste plug device 110 is preferably of a thickness such that a lower surface 136 may extend beyond the plane formed by teeth 124 in order to completely push a waste plug from the hole saw. Of course, waste plug device 110 does not need to be formed with a circular plug member portion 112.

The objects of the invention are achieved by adding a novel waste plug removing device to a conventional hole saw and by forming a hole saw during manufacture to include an integral waste plug device. In both forms a waste plug may be readily removed without the need for external tools and without causing damage to the hole saw. Equal pressure may be applied to the waste plug to prevent camming and jamming of the plug within the hole saw. The devices of the invention are simple and easy to operate.

In considering this invention, it must be remembered that the disclosure is illustrative only and the scope of the invention is to be determined by the appended claims.

I claim:

1. A hole saw comprising:
   (a) a cylindrical member having an upper and lower circumferential edge, the lower circumferential edge being formed so as to present a plurality of cutting teeth;
   (b) a mandrel joined to the upper circumferential edge of said cylindrical member, said mandrel further including a pilot drill extending through the interior of said cylindrical member along its central axis;
   (c) said cylindrical member having at least two spaced cleaning slots extending between said lower and to said upper circumferential edges, and
   (d) means for removing a waste plug of material from the interior of said cylindrical member, said means including a plug member which encircles said pilot drill without engaging same, said member further including projections which extend outwardly through at least two of said cleaning slots, the portion of said projections extending externally of said cylindrical member being constructed and arranged such that it cannot pass into the interior of said cylindrical member through said cleaning slots, said outermost portion of said projections providing handles which may be grasped and pushed toward said cutting teeth to dislodge a waste plug from the interior of said hole saw.

2. The hole saw of claim 1 wherein the portion of each projection extending externally of said cylindrical member is joined to its adjacent externally extending projection so as to define an annulus.

3. The hole saw of claim 1 further including spring means positioned between said mandrel and said plug member such that said plug member is normally biased downwardly toward said cutting teeth.

4. The hole saw of claim 2 further including spring means positioned between said mandrel and said plug member such that said plug member is normally biased downwardly toward said cutting teeth.

5. The hole saw of claim 4 wherein said plug member is a disk having a central perforation through which the pilot drill extends, said disk having a thickness such that when said disk is in its most downward position toward said cutting teeth the outer surface of said disk extends beyond the plane defined by the lower circumferential edge of said cylindrical member such that a waste plug would be pushed completely out of said cylindrical member.

6. In a hole saw comprising a cylinder member having an upper and lower circumferential edge, the lower circumferential edge being formed so as to present a plurality of cutting teeth, the upper edge being rigidly joined to a mandrel, said mandrel including a pilot drill extending through the interior of said cylinder member, and said cylinder member having at least two spaced cleaning slots extending between said lower and upper edges, the improvement comprising:
(a) waste plug removing means for providing a tool to remove a plug of waste material cut by said hole saw from the interior of said hole saw, said means including a plug member sized such that it may freely pass into the interior of said cylinder member and having an opening therethrough through which the pilot drill extends, said means further including means extending from said plug member through at least two of said spaced cleaning slots to the exterior of said cylinder member, said extension means providing projections on the outside of said cylinder member which may be manually grasped and pulled toward said cutting teeth to thereby dislodge any waste plug from the interior of said hole saw.

7. The waste plug removing means of claim 6 further including spring means in engagement with an upper surface of said plug member such that when said waste plug removing means is positioned in a hole saw, the spring means causes said plug member to be normally biased downwardly toward said cutting teeth.

8. The waste plug removing means of claim 7 wherein said spring means is a compression spring whose axis is positioned over the center of the plug member opening.

9. The waste plug removing means of claim 6 wherein said means extending from said plug member are shouldered, collared screws.

10. A waste plug removing assembly adapted to be attached to a conventional hole saw, said hole saw having a cylindrical body with teeth at its lower end and a mandrel secured to its upper end, said mandrel including a pilot drill extending through said cylindrical body, said hole saw further including at least two cleanout slots, each extending between the mandrel and the teeth, the assembly comprising:
(a) a plug member constructed and arranged such that it may pass unimpeded into said cylindrical body around said pilot drill; and
(b) screw members each having a head portion having a greater cross-section than the width of said clean-out slots, said screw members being releasably joined to said plug member such that said plug member may be inserted into the interior of a hole saw and said screw members may be inserted through said cleaning slots and attached to said plug member, thereby retaining the plug member within said hole saw, said head portions being constructed and arranged so as to provide handles which may be grasped or pushed toward said teeth when said assembly is attached to a hole saw so as to dislodge a waste plug from the interior of said hole saw.

11. The waste plug removing assembly of claim 10 further including spring means in engagement with the surface of said plug member which faces a mandrel of a hole saw when positioned within same such that when so positioned, said spring means causing said plug member to be normally biased downwardly toward the cutting teeth of the hole saw.

* * * * *